United States Patent [19]

Schubart et al.

[11] 4,306,992

[45] Dec. 22, 1981

[54] VULCANIZATION SYSTEM, A RUBBER MIXTURE CONTAINING THIS VULCANIZATION SYSTEM AND A VULCANIZATION PROCESS

[75] Inventors: Rüdiger Schubart, Bergisch-Gladbach; Ulrich Eholzer; Theo Kempermann, both of Cologne; Ernst Roos, Odenthal, all of Fed. Rep. of Germany

[73] Assignee: Bayer Aktiengesellschaft, Fed. Rep. of Germany

[21] Appl. No.: 146,699

[22] Filed: May 5, 1980

[30] Foreign Application Priority Data

May 8, 1979 [DE] Fed. Rep. of Germany ....... 2918469

[51] Int. Cl.$^3$ .......................... C08K 5/34; C08K 5/43; C08K 5/46
[52] U.S. Cl. ............................ 252/182; 260/45.85 N; 260/780; 260/784; 260/792; 525/348; 525/349; 525/351

[58] Field of Search ................ 252/182; 260/45.85 N, 260/780, 784, 792; 525/348, 344, 351, 360

[56] References Cited

U.S. PATENT DOCUMENTS

| | | | |
|---|---|---|---|
| B. 245,194 | 1/1975 | Maxey ................................. | 252/182 |
| 2,945,834 | 7/1960 | Bryans et al. ........................ | 525/349 |
| 3,579,460 | 5/1971 | Kerwood ............................ | 252/182 |
| 4,012,332 | 3/1977 | Behrens .............................. | 252/182 |
| 4,062,797 | 12/1977 | Behrens .............................. | 252/182 |

*Primary Examiner*—Benjamin R. Padgett
*Assistant Examiner*—Irwin Gluck
*Attorney, Agent, or Firm*—Connolly and Hutz

[57] ABSTRACT

A mixture comprising sulphur or a sulphur donor, a mercapto- or sulfenamide vulcanization accelerator, a compound containing a thiophenyl radical and a standard auxiliary accelerator is used as a vulcanization system for natural or synthetic rubber.

2 Claims, No Drawings

VULCANIZATION SYSTEM, A RUBBER MIXTURE CONTAINING THIS VULCANIZATION SYSTEM AND A VULCANIZATION PROCESS

This invention relates to a vulcanisation system comprising a sulphur donor, a mercapto or sulphenamide accelerator, a compound containing a thiophenyl radical and a standard auxiliary accelerator, to a vulcanisable rubber mixture comprising natural and/or synthetic rubber, the above-mentioned vulcanisation system and conventional additives and to a process for the vulcanisation thereof.

Using the vulcanisation systems according to the invention, it is possible to vulcanise rubbers which, after vulcanisation, show improved reversion resistance.

Reversion is understood to be the reduction in the degree of crosslinking and mechanical properties of vulcanisates (such as tensile strength, tear propagation resistance and elasticity) which occurs when vulcanisation is continued beyond the optimum level. Reversion occurs in the vulcanisation of diene rubbers, particularly natural rubber and synthetic polyisoprene at high vulcanisation temperatures and with long vulcanisation times as required in the production of voluminous articles (for example truck tyres). The application of economically desirable high vulcanization temperatures is limited by the occurrence of reversion.

Hitherto, it has only been possible to a limited extent to improve resistance to reversion.

It is known that the resistance to reversion of vulcanisation systems can be improved by using smaller quantities of sulphur. Whereas in "normal sulphur vulcanisation" sulphur is used in quantities of from about 1.8 to 2.5 phr (parts by weight, based on 100 parts by weight of rubber), "semi-efficient systems" use sulphur in average quantities of from about 1 to 1.8 phr whilst "efficient systems" use less than 1 phr of sulphur. However, by comparison with normal sulphur vulcanisation, the use of reduced quantities of sulphur gives rise to disadvantages in regard to resistance to cracking, tear propagation resistance, resistance to wear and cord adhesion of the vulcanisates, which limits the application of vulcanisation with small and medium quantities of sulphur. In the production of tyres for example, it is impossible to reduce the quantity of sulphur used to below medium levels (approximately 1.5).

It is also known that the type of vulcanisation accelerator used has a bearing on the resistance of the rubber mixtures of reversion. Whereas ultra accelerators, such as dithiocarbamates, thiurams, and basic accelerators, such as diphenyl guanidine, produce low resistance to reversion, mercapto accelerators, such as mercapto benzthiazole, dibenzothiazyl disulphide and the zinc salt of mercapto benzthiazole, and sulphenamide accelerators, such as benzothiazyl-2-cyclohexyl sulphenamide, benzothiazyl-2-t-butyl sulphenamide, benzothiazyl-2-morpholine sulphenamide and benzothiazyl dicyclohexyl sulphenamide, show more favourable behaviour so far as resistance to reversion is concerned.

Accordingly, it is known that vulcanisation systems for diene rubbers having improved resistance to reversion can be made up as follows:

(a) medium quantities of sulphur (approximately 1.4 to 1.6 phr), (b) mercapto or sulphenamide accelerator (approximately 1 to 2 phr).

However, vulcanisation systems such as these also promote reversion at high vulcanisation temperatures (for example above 170° C.) and with long heating times.

It is also known that the addition of vulcanisation accelerators of the dithiophosphate type, such as zinc dibutyl dithiophosphate, to the vulcanisation systems described above improves their resistance to reversion (H. Ehrend, Gummi, Asbest, Kunststoffe 3c (1977), pages 68 to 71). Although these accelerators improve reversion, they undesirably shorten the scorch time. This is a disadvantage because adequate safety in processing is necessary, particularly in applications where an improvement in resistance to reversion is of particular interest, as, for example, in the production of truck tyres and, generally, in the production of voluminous articles.

Accordingly, the object of the present invention is to provide a vulcanisation system which increases the resistance to reversion of rubber vulcanisates and, at the same time, does not shorten the scorch time during their vulcanisation.

Accordingly, the present invention provides a vulcanisation system consisting of (a) from 20 to 50 parts by weight and preferably from 40 to 50 parts by weight of sulphur or from 20 to 50 parts by weight and preferably from 40 to 50 parts by weight of a sulphur donor, (b) from 20 to 50 parts by weight and preferably from 20 to 30 parts by weight of an accelerator of the mercapto or sulphenamide group, (c) from 0 to 10 parts by weight and preferably from 0 to 5 parts by weight of a conventional auxillary accelerator and (d) from 20 to 50 parts by weight and preferably from 20 to 30 parts by weight of a compound corresponding to the following general formula (1):

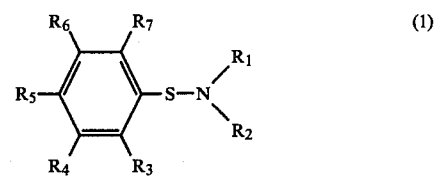

in which $R_1$ represents a hydrogen atom, a $C_1$–$C_{10}$-alkyl or alkenyl radical, a $C_5$–$C_7$-cycloalkyl or cycloalkenyl radical, a $C_6$–$C_{10}$-aryl group optionally substituted one or more times, preferably once or twice, by $C_1$–$C_4$-alkyl radicals, $R_2$ represents a hydrogen atom, a $C_1$–$C_{10}$-alkyl or alkenyl radical, a $C_5$–$C_7$-cycloalkyl or cycloalkenyl radical, a $C_6$–$C_{10}$-aryl group optionally substituted one or more times, preferably once or twice, by $C_1$–$C_4$-alkyl radicals, a radical corresponding to general formula (2) or (3) below

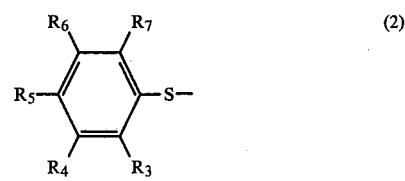

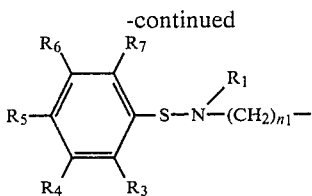

in which $n_1$ is a number of from 2 to 10 and preferably from 2 to 6, $R_1$ and $R_2$ together form a 4-membered to 10-membered ring, preferably a 2- to 7-membered carbocyclic ring, optionally containing a heteroatom, such as N, O, S in the ring, $R_3$ to $R_7$ may be the same or different and each represents a hydrogen atom, a halogen atom or a nitro, cyano, —$CF_3$ or —$C Cl_3$ radical or an alkoxy carbonyl radical with a $C_1$–$C_4$ alkyl in the alkoxy radical, a $C_1$–$C_4$-alkyl in the alkoxy radical, the proviso that not all the radicals $R_3$ to $R_7$ simultaneously represent hydrogen atoms, or of a compound corresponding to the following general formula:

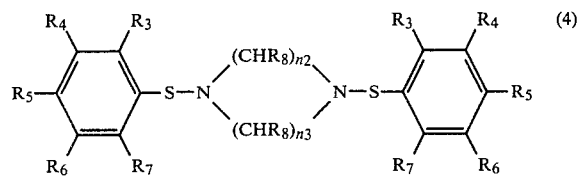

in which $n_2$ and $n_3$ may be the same or different and each represents a number of from 2 to 10 and preferably from 2 to 3, and $R_8$ represents a hydrogen atom or a methyl group, or of a compound corresponding to the following formula (5)

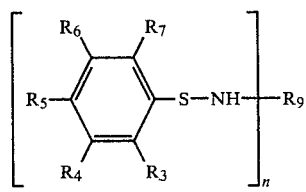

in which n represents a number of 2 or 3 and $R_9$ represents a $C_4$–$C_{12}$ cycloalkyl radical, a $C_6$–$C_{10}$ aryl group, a di-$C_4$–$C_{12}$ cycloalkyl-$C_1$–$C_4$-alkyl radical, a tri-$C_4$–$C_{12}$-cycloalkyl-$C_1$–$C_4$ alkyl radical, a di-$C_6$–$C_{10}$-aryl-$C_1$–$C_4$-alkyl radical or a tri-$C_6$–$C_{10}$ aryl-$C_1$–$C_4$ alkyl, the sum of components (a) to (d) amounting to 100.

The present invention also relates to a vulcanizable mixture consisting of natural and/or synthetic rubber of halogen-free dienes, the above-mentioned vulcanisation system and, optionally, other conventional additives.

The present invention also provides a process for the vulcanisation of natural and/or synthetic rubber of halogen-free dienes in the presence of sulphur and/or sulphur donors, vulcanisation accelerators and, optionally, conventional additives, characterized in that (a) from 0.1 to 5 phr and preferably from 1 to 2 phr of sulphur or from 0.2 to 10 phr and preferably from 2 to 4 phr of a sulphur donor, (b) from 0.1 to 5 phr and preferably from 0.4 to 2 phr of an accelerator of the mercapto or sulphenamide group, (c) from 0 to 5 phr and preferably from 0 to 1 phr of a conventional auxiliary accelerator and (d) from 0.1 to 5 phr and preferably from 0.4 to 2.5 phr of a compound corresponding to general formula (1) or (4) as previously defined, are separately or simultaneously added to the rubber which is then vulcanised in the conventional manner.

Sulphur donors of group (a) are compounds which split off sulphur under the vulcanisation conditions. Compounds such as these are inter alia dimorpholy disulphide (DTDM), tetramethyl thiuram disuphide (TMTD) or 2-(4-morpholinyldithio)-benzothiazole.

Examples of accelerators of the mercapto group in (b) are 2-mercaptobenzthiazole (MBT), dibenzothiazyl disulphide (MBTS) or the zinc salt of 2-mercaptobenzthiazole (ZMBT).

Examples of accelerators of the sulphenamide group in (b) are benzothiazyl-2-cyclohexyl sulphenamide (CBS), benzothiazyl-2-t-butyl sulphenamide (TBBS), benzothiazoyl-2-morpholine sulphenamide (MBS), benzothiazyl dicyclohexyl sulphenamide (DCBS), 2-(4-morpholinyl-dithio)-benzothiazole or morpholinyl thiocarbonyl sulphene morpholide.

MBT, MBTS, CBS, TBBS and MBS are preferred.

Conventional auxiliary accelerators in (c) are, for example, tetramethyl thiuram disulphide (TMTD), tetramethyl thiuram monosulphide (TMTM), zinc-N-dimethyl dithiocarbamate (ZDMC), zinc-N-diethyl dithiocarbamate (ZDEC), zinc-N-dibutyl dithiocarbamate (ZDBC), zinc-N-ethyl phenyl dithiocarbamate (ZEPC) or zinc-N-methylene dithiocarbamate (Z5MC).

The substitutents of the compounds in (d) may have the following particular meanings:

The alkyl radicals in $R_1$ and $R_2$ may be methyl, ethyl, n-propyl, isopropyl, allyl, propenyl, n-butyl, sec.-butyl, t-butyl, n-pentyl, sec.-pentyl, t-pentyl, n-hexyl, sec.-hexyl, t-hexyl, heptyl, octyl, 2-ethyl hexyl, nonyl and decyl radicals. Cycloalkyl may be cyclopentyl, cyclopentenyl, cyclohexyl, cyclohexenyl, cycloheptenyl, cycloheptadienyl and cycloheptatrienyl. Aryl may be phenyl, naphthyl, anthracenyl and phenyl substituted by 1 to 5 alkyl radicals of the type mentioned above. Examples are 2-tolyl, 3-tolyl, 4-tolyl, the various isomers of o-, m-, and p-xylyl, mesitilyl, cumyl, duryl, t-butyl phenyl and isopropyl phenyl.

The methylene radical—$(CH_2)_{n1}$—in the substituent $R_2$ in formula (3) is a methylene, ethylene, propylene, butylene, pentylene, hexylene, heptylene, octylene, nonylene or decylene radical.

The radicals—$(CHR_8)_{n2}$—and—$(CHR_8)_{n3}$—in formula (4) have the same meaning. In addition, they may represent, together with the two N-atoms, piperazine, 2,6-dimethyl piperazine or 2,5-dimethyl piperzine.

In addition, $R_1$ and $R_2$ may form a 4- to 10-membered ring optionally containing one heteroatom, such as N, O or S. The morpholinyl radical, the N-methyl piperazinyl radical and the thiamopholinyl radical are mentioned as examples. In addition, however, it is also possible to use pyrrolidine, piperidine, perhydroazepine, azacyclooctane, azacyclonane, azacyclodecane, perhydro-oxazole, perhydrothiazole and N-methyl perhydroimidazole. However, these ring systems may also be part of a larger ring system such as, for example, 1,2,3,4-tetrahydroquinoline, indole, 2-methyl indole, 2,3-dimethyl indole, perhydro indole, carbazole and perhydro carbazole, and also 7-azanorbornane and 7-azanorbornene.

$R_3$ to $R_7$ may be the same or different. They may represent a hydrogen atom, a halogen atom such as chlorine, bromine or fluorine, $NO_2$, CN, $C_1$–$C_4$ alkyl of the type mentioned above, $CF_3$, $CCl_3$ and $C_1$–$C_4$-alkoxy carbonyl as the alcohol radical, with the proviso that not all the radicals $R_3$ to $R_7$ may simultaneously represent hydrogen atoms. In general, however, $R_3$ to $R_7$ will preferably be chlorine.

The following compounds are mentioned by way of example:

N-amino-thiopentachlorobenzene;
N-dimethyl-amino-thiopentachlorobenzene;
N-diethyl-amino-thiopentachlorobenzene;
N-di-n-propyl-amino-thiopentachlorobenzene;
N-di-iso-propyl-amino-thiopentachlorobenzene;
N-di-n-butyl-amino-thiopentachlorobenzene;
N-di-sec-butyl-amino-thiopentachlorobenzene;
N-di-t-butyl-amino-thiopentachlorobenzene;
N-di-n-pentyl-amino-thiopentachlorobenzene;
N-di-sec-pentyl-amino-thiopentachlorobenzene;
N-di-t-pentyl-amino-thiopentachlorobenzene;
N-di-n-hexyl-amino-thiopentachlorobenzene;
N-di-heptyl-amino-thiopentachlorobenzene;
N-aziridino-thiopentachlorobenzene;
N-di-octyl-amino-thiopentachlorobenzene;
N-di-2-ethyl-hexyl-amino-thiopentachlorobenzene;
N-di-nonyl-amino-thiopentachlorobenzene;
N-di-decyl-amino-thiopentachlorobenzene;
N-methyl-amino-thiopentachlorobenzene;
N-ethyl-amino-thiopentachlorobenzene;
N-propyl-amino-thiopentachlorobenzene;
N-isopropyl-amino-thiopentachlorobenzene;
N-butyl-amino-thiopentachlorobenzene;
N-sec-butyl-amino-thiopentachlorobenzene;
N-t-butyl-amino-thiopentachlorobenzene;
N-pentyl-amino-thiopentachlorobenzene;
N-heptyl-amino-thiopentachlorobenzene;
N-octyl-amino-thiopentachlorobenzene;
N-nonyl-amino-thiopentachlorobenzene;
N-decyl-amino-thiopentachlorobenzene;
N-2-ethyl-hexyl-amino-thiopentachlorobenzene;
N-phenyl-amino-thiopentachlorobenzene;
N-2-methyl-phenyl-amino-thiopentachlorobenzene;
N-3-methyl-phenyl-amino-thiopentachlorobenzene;
N-4-methyl-phenyl-amino-thiopentachlorobenzene;
N-dimethyl-phenyl-amino-thiopentachlorobenzene;
N-diethyl-phenyl-amino-thiopentachlorobenzene;
N-diisopropylene-phenyl-amino-thiopentachlorobenzene;
N,N-ethyl-imino-bis-(thiopentachlorobenzene);
N,N-propyl-imino-bis-(thiopentachlorobenzene);
N,N-isopropyl-imino-bis-(thiopentachlorobenzene);
N,N-amino-bis-(thiopentachlorobenzene);
N,N-butyl-imino-bis-(thiopentachlorobenzene);
N,N-sec-butyl-imino-bis-(thiopentachlorobenzene);
N,N-t-butyl-imino-bis-(thiopentachlorobenzene);
N,N-pentyl-imino-bis-(thiopentachlorobenzene);
N,N-hexyl-imino-bis-(thiopentachlorobenzene);
N,N-heptyl-imino-bis-(thiopentachlorobenzene);
N,N-t-heptyl-imino-bis-(thiopentachlorobenzene);
N,N-octyl-imino-bis-(thiopentachlorobenzene);
N,N-nonyl-imino-bis-(thiopentachlorobenzene);
N,N-decyl-imino-bis-(thiopentachlorobenzene);
N,N-phenyl-imino-bis-(thiopentachlorobenzene);
N,N-cyclohexyl-imino-bis-(thiopentachlorobenzene);
N-cyclohexyl-amino-thiopentachlorobenzene;
N-methyl-cyclohexyl-amino-thiopentachlorobenzene;
N-trimethyl-cyclohexyl-amino-thiopentachlorobenzene;
N-dimethyl-cyclohexyl-amino-thiopentachlorobenzene;
N,N-trimethyl-cyclohexyl-amino-bis-(thiopentachlorobenzene);
N,N'-ethylene-diamino-bis-(thiopentachlorobenzene);
N,N'-propylene-diamino-bis-(thiopentachlorobenzene);
N,N'-butylene-diamino-bis-(thiopentachlorobenzene);
N,N'-pentylene-diamino-bis-(thiopentachlorobenzene);
N,N'-hexylene-diamino-bis-(thiopentachlorobenzene);
N,N-heptylene-diamino-bis-(thiopentachlorobenzene);
N,N'-octylene-diamino-bis-(thiopentachlorobenzene);
N,N'-nonylene-diamino-bis-(thiopentachlorobenzene);
N,N'-decylene-diamino-bis-(thiopentachlorobenzene);
N,N'-1,2-phenylene-diamino-bis-(thiopentachlorobenzene);
N,N'-1,3-phenylene-diamino-bis-(thiopentachlorobenzene);
N,N'-1,4-phenylene-diamino-bis-(thiopentachlorobenzene);
N,N'-(bis-1,4-aminomethyl-benzene)-bis-(thiopentachlorobenzene);
N-benzyl-amino-thiopentachlorobenzene;
N-benzyl-amino-bis-(thiopentachlorobenzene);
N-methyl-benzyl-amino-(thiopentachlorobenzene);
N,N-phenylene-1,4-diamino-bis-(thiopentachlorobenzene);
N,N'-cyclohexylene-1,4- or 1,2-diamino-bis-(thiopentachlorobenzene);
N,N'-(1-amino-3-aminomethyl-3,5,5-trimethylcyclohexane)-bis-(thiopentachlorobenzene);
N,N'-(4,4'diamino-dicyclohexyl-methane)-bis-(thiopentachlorobenzene);
N,N'-(4,4'-diamino-3,3'-dimethyl-dicyclohexylmethane)-bis-(thiopentachlorobenzene);
N,N'-piperazino-bis-(thiopentachlorobenzene);
N,N'-hexylene-diamino-bis-(thiopentachlorobenzene);
N-pyrrolidino-thiopentachlorobenzene;
N-piperidino-thiopentachlorobenzene;
N-perhydroazepino-thiopentachlorobenzene;
N-morpholino-thiopentachlorobenzene;
N-hydroxy-ethyl-methyl-amino-thiopentachlorobenzene;
N-dihydroxy-ethyl-amino-thiopentachlorobenzene;
N-hydroxy-ethyl-amino-thiopentachlorobenzene;
N-glycine-thiopentachlorobenzene;
N-cyano-ethyl-amino-thiopentachlorobenzene;
N-(4-amino-2,2,6,6-tetramethyl-piperidino)-thiopentachlorobenzene;
N-dicyclohexyl-amino-thiopentachlorobenzene; and
N-diphenyl-amino-thiopentachlorobenzene;

The following compounds are preferred:
N-dimethylamino-thiopentachlorobenzene;
N-diisopropyl-amino-thiopentachlorobenzene;
N-di-t-butyl-amino-thiopentachlorobenzene;
N-dimethyl-amino-(thio-2-nitrobenzene);
N-dimethyl-amino-thio-(2-carboxymethylbenzene);
N-dimethyl-amino-thio-(2-carboxy-benzene);
N-dimethyl-amino-(thio-4-methyl-benzene);
N-dimethyl-amino-thio-(4-chlorobenzene);
N-dimethyl-amino-thio-(2-cyanobenzene);
N-dimethyl-amino-thio-(2-trifluoromethyl-benzene);
N-methyl-amino-thiopentachlorobenzene;
N-t-butyl-amino-thiopentachlorobenzene;
N-pentyl-amino-thiopentachlorobenzene;
N,N-cyclohexyl-imino-bis-(thiopentachlorobenzene);
N-cyclohexyl-amino-thiopentachlorobenzene;

N,N'-ethylene-diamino-bis-(thiopentachlorobenzene);
N,N'-piperadine-bis-(thiopentachlorobenzene);
N'-morpholino-thiopentachlorobenzene; and
N,N'-methyl-amino-bis-(thiopentachlorobenzene).

The substituent $R_9$ in formula 5 may represent the following moieties in case n stands for 2: o, m, p-phenylene, perhydrogenated o,m,p-phenylene, o,m,p-dimethylbenzene, 1,2-dimethylcyclohexan, 1,3-dimethylcyclohexan, 1,4-dimethylcyclohexan, 1,2-substituted naphthalene, 1,4-substituted naphthalene, 1,5-substituted naphthalene, 1,8-substituted naphthalene, the mentioned naphthalene moieties in tetrahydrated and perhydrogenated form, 2.4-substituted toluene, 2.3-substituted toluene, 3,4-substituted toluene, 2,5 substituted toluene, 2,6-substituted toluene, the mentioned toluene moieties in perhydrogenated form, isophorone-diradical, 4,4'-substituted diphenylmethane, 4,4'-substituted diphenylethane, 4,4'-substituted diphenylpropane, and the mentioned diphenylalkanes in partly or totally hydrogenated form.

In addition $R_9$ may represent a $C_4$-$C_{12}$cycloalkyl moiety such as cyclobutyl, cyclopentyl, cyclohexyl, cycloheptyl, cyclooctyl, cyclononyl, cyclodecyl, cycloundecyl, cyclododecyl. These moieties may contain a lower alkyl $C_1$-$C_4$ radical such as methyl, ethyl, propyl, isopropyl and butyl.

In case of n stands for 3 $R_9$ may represent the following moieties: tricycloalkyl-alkyl, triphenyl-alkyl, both may be substituted by $C_1$-$C_4$ alkyl such as 4,4', 4"-tricyclohexylmethyl, 4,4',4" tri(2-methylcyclohexyl)-methyl, 4,4',4"triphenylmethyl, 4,4',4"-tri(2-methylphenyl)-methyl.

The following compounds may be mentioned:
N,N'-Phenylene-1,2-di(amino-thiopentachlorbenzene)
N,N'-Phenylene-1,3-di(amino-thiopentachlorbenzene)
N,N'-Phenylene-1,4-di-(amino-thiopentachlorbenzene)
N,N'-Cyclohexylene-1,2-di(amino-thiopentachlorbenzene)
N,N'-Cyclohexylene-1,3-di(amino-thiopentachlorbenzene)
N,N'-Cyclohexylene-1,4-di(amino-thiopentachlorbenzene)
N,N'-Xylylene-1,2-di(amino-thiopentachlorbenzene)
N,N'-Xylylene-1,3-di(amino-thiopentachlorbenzene)
N,N'-Xylylene-1,4-di(amino-thiopentachlorbenzene)
N,N'-Naphthylene-1,2-di(amino-thiopentachlorbenzene)
N,N'-Naphthylene-1,4-di(amino-thiopentachlorbenzene)
N,N'-Naphthylene-1,5-di(amino-thiopentachlorbenzene)
N,N'-Naphthylene-1,8-di(amino-thiopentachlorbenzene)
N,N'-1,2,3,4-Tetrahydronaphthylene-1,4-di(amino-thiopentachlorbenzene)
N,N'-1,2,3,4-Tetrahydronaphthylene-1,5-di(amino-thiopentachlorbenzene)
N,N'-1,2,3,4-Tetrahydronaphthylene-1,8-di(amino-thiopentachlorbenzene)
N,N'-Perhydronaphthylene-1,2-di(amino-thiopentachlorbenzene)
N,N'-Perhydronaphthylene-1,3-di(amino-thiopentachlorbenzene)
N,N'-Perhydronaphthylene-1,4-di(amino-thiopentachlorbenzene)
N,N'-Perhydronaphthylene-1,5-di(amino-thiopentachlorbenzene)
N,N'-Perhydronaphthylene-1,8-di(amino-thiopentachlorbenzene)
N,N'-Toluylene-2,3-di(amino-thiopentachlorbenzene)
N,N'-Toluylene-2,4-di(amino-thiopentachlorbenzene)
N,N'-Toluylene-2,5-di(amino-thiopentachlorbenzene)
N,N'-Toluylene-2,6-di-(amino-thiopentachlorbenzene)
N,N'-Toluylene-3,4-di(amino-thiopentachlorbenzene)
N,N'-Perhydrotoluylene-2,3-di(amino-thiopentachlorbenzene)
N,N'-Perhydrotoluylene-2,4-di(amino-thiopentachlorbenzene)
N,N'-Perhydrotoluylene-2,5-di(amino-thiopentachlorbenzene)
N,N'-Perhydrotoluylene-2,6-di(amino-thiopentachlorbenzene)
N,N'-Perhydrotoluylene-3,4-di(amino-thiopentachlorbenzene)
N,N'-Diphenyl-4,4'-di(amino-thiopentachlorbenzene)methane
N,N-2,2-Diphenyl-4,4'-di(amino-thiopentachlorbenzene)propane
N,N'N"-Triphenyl-4,4',4"-tri(amino-thiopentachlorbenzene)methane
N,N',N"-Tri(-2methylphenyl)-4,4'-4"-tri(amino-thiopentachlorobenzene)-methane
N,N',N"-Tri-cyclohexyl-4,4',4"-tri(amino-thiopentachlorbenzene)-methane
N,N'-Cyclobutylene-1,3-di(amino-thiopentachlorbenzene)
N,N'-Cyclopentylene-1,2-di(amino-thiopentachlorbenzene)
N,N'-Cycloheptylene-1,4-di(amino-thiopentachlorbenzene)
N,N'-Cyclopentylene-1,3-di(amino-thiopentachlorobenzene)
N,N'-Cycloheptylene-1,3-di(amino-thiopentachlorbenzene)
N,N'-Cyclooctylene-1,2-di(amino-thiopentachlorbenzene)
N,N'-Cyclooctylene-1,3-di(amino-thiopentachlorbenzene)
N,N'-Cyclooctylene-1,4-di(amino-thiopentachlorbenzene)
N,N'-Cyclononylene-1,3-di(amino-thiopentachlorbenzene)
N,N'-Cyclodecylene-1,5-di(amino-thiopentachlorbenzene)
N,N'-Cycloundecylene-1,5-di(amino-thiopentachlorbenzene)
N,N'-Cyclododecylene-1,6-di(amino-thiopentachlorbenzene).

The compounds corresponding to formulae (1) and (5) include both known and also novel compounds. They may all be obtained by the process according to J. I. Eitingon, Zh. Obshch. Khim. 34(5) 1608 (1964). The vulcanisation systems according to the invention have advantages in regard to reversion-resistance after prolonged vulcanisation and/or at high vulcanisation temperatures (for example 45 minutes at 180° C.) and in regard to mechanical properties, such as modulus value, tensile strength, breaking elongation, hardness, elasticity, tear propagation-resistance, disintegration-resistance, fatigue strength, heat build-up, dynamic flow and wear.

The individual components of the vulcanisation system may be added to the diene rubbers or rubber mixtures before vulcanisation either separately or in the form of a mixture or rubber-accelerator master batch (cf. Ullmann's Encyklopädie der technischen Chemie, 3rd Edition, Verlag Urban & Schwarzenberg, Munich-Berlin 1957, Vol. 9, page 364).

Examples of synthetic rubber of halogen-free dienes are polyisoprene, polybutadiene, styrene-butadiene rubber, nitrile rubber and blends thereof.

The diene rubbers may contain all the conventional additives, such as fillers, particularly carbon blacks, mineral oils, plasticisers, tackifiers, accelerator activators, particularly stearic acid, waxes, anti-agars, anti-ozonants, blowing agents, dyes and pigments.

Fillers, such as the carbon blacks used in the rubber-processing industry, also silica, particularly finely divided silica, silica obtained in the gaseous phase and hydrophobic silica, as well as finely divided metal oxides, including mixed oxides and oxide mixtures, are valuable constituents of the mixture.

The vulcanisation of the diene rubbers is carried out at temperatures of generally from about 100° C. to about 300° C. and preferably from 140° C. to 240° C. Vulcanisation may be carried out by any of the usual methods, such as press-heating, heating with superheated steam, hot air, salt bath, fluidised bed, ultra-high frequency and steam tube.

The invention is illustrated by the following Examples:

| List of Abbreviations and Test Methods: | |
|---|---|
| MBT | = 2-mercaptobenzothiazole |
| MBTS | = dibenzothiazyl disulphide |
| ZMBT | = zinc salt of 2-mercaptobenzothiazole |
| CBS | = benzothiazyl-2-cyclohexyl sulphenamide |
| TBBS | = benzothiazyl-2-t-butyl sulphenamide |
| MBSS | = 2-(4-morpholinyl-dithio-benzothiazole) |
| DTDM | = dimorpholyl disulphide |
| MBS | = benzothiazyl-2-morpholine sulphenamide |
| DCBS | = benzothiazyl-dicyclohexyl sulphenamide |
| TMTD | = tetramethyl thiuram disulphide |
| TMTM | = tetramethyl thiuram-monosulphide |
| ZDMC | = zinc-N-dimethyl dithiocarbamate |
| ZDEC | = zinc-N-diethyl dithiocarbamate |
| ZDBC | = zinc-N-dibutyl dithiocarbamate |
| ZEPC | = zinc-N-ethyl phenyl dithiocarbamate |
| Z5MC | = zinc-N-pentamethylene dithiocarbamate |
| TMQ | = polymerised 2,2,4-trimethyl-dihydroquinoline |
| IPPD | = N-phenyl-N'-isopropyl-p-phenylene amine |
| Vulcameter | Bayer-vulcameter, heating-up time 1 minute, measuring range 3/20 mV |
| $t_s$ (30)/130° C. (mins) 160° C. | scorch time from vulcameter measurement at 130° C. and 160° C., time taken by the shear modulus curve to rise 30 mm above the minimum at $t_s$ (15) 15 mm above the minimum |
| Fe-Fa (mm) | shear modulus (end value minus initial value); in the case of rising curves, limiting value after a running time of 45 minutes at the temperature indicated, for example (160° C.) |
| $t_{90}$ (mins) | cure time, time taken to reach 90% of the maximum shear modulus (Bayer-vulcameter) |
| Stage heating | 4 mm flaps, press heating |
| $M_{300}$ (MPa) | modulus at 300% elongation, DIN 53 504 |
| F (MPa) | tensile strength, DIN 53504, standard ring R 1 |
| D (%) | breaking elongation, DIN 53504, standard ring R 1 |
| H (Shore A) | Shore A hardness, DIN 53504, standard ring R 1 |
| E (%) | resilience, DIN 53512, 4 mm flap |
| Structure according to Pohle (N) | ring structure |
| Reversion (%) | from stage heating: |

-continued

| List of Abbreviations and Test Methods: | | |
|---|---|---|
| T(°C.) | $\dfrac{M_{300} \text{ after 45 mins}/180° \text{C.}}{M_{300} - \text{maximum at } 150° \text{C.}} \times 100$ temperature increase in a Goodrich Flexometer DIN 53533 starting temperature 100° C., stat. initial load 10.0 kp/cm², stroke ± 5.71 mm, frequency: 24 c/s | |
| Fatigue: | by the chain test method: An endless toothed profile belt 1.6 meters long (9 individual test specimens pinned together) travels under weak tension around 4 guide rollers 50 mm in diameter (sharp curvature). 17,600 bends. The test takes place in the open. The results are evaluated on a predetermined specimem scale in which 0 = no crack formation 1 = slight crack formation | |
| Ball disintegration | ball diameter | 30 mm |
| | initial force | 147 N |
| | additional force in stages of | 49 N |
| | max. force approximately | 1000 N |
| | number of revolutions | 2000 |
| | rotational speed | 135 r.p.m. |
| | running time/force stage | 14.8 mins. |

EXAMPLE 1

This Example is a comparison between a semi-efficient system (1) which only contains sulphur and MBS, a system (2) containing zinc dibutyl dithiophosphate as additive and a system according to the invention (3) containing N-dimethylamino-thiopentachlorobenzene.

A master batch was prepared in an internal mixer from the following constituents:

| | |
|---|---|
| natural rubber | 80.0 phr |
| polybutadiene | 20.0 phr |
| carbon black N 330 (HAF) | 55.0 phr |
| aromatic mineral oil | 3.0 phr |
| stearic acid | 2.5 phr |
| microcrystalline anti-ozonant wax | 1.0 phr |
| IPPD | 1.5 phr |
| TMQ | 1.0 phr |
| zinc oxide | 5.0 phr |

The following constituents are then mixed on laboratory mixing rolls:

| System 1 | 1.425 phr | sulphur |
|---|---|---|
| | 1.20 phr | MBS |
| system 2 | 1.425 phr | sulphur |
| | 0.60 phr | MBS |
| | 1.20 phr | zinc dibutyl dithiophosphate |
| system 3 | 1.425 phr | sulphur |
| | 0.60 phr | MBS |
| | 1.20 phr | N-dimethylamino-thiopentachlorobenzene |

| | 1 | 2 | 3 |
|---|---|---|---|
| Reversion resistance (%) after 45 minutes/180° C. based on $M_{300}$ | 53.5 | 72 | 79 |
| Scorch time $t_s$ (mins) at 130° C. | 18.2 | 10.7 | 20 |
| Cure time $t_{90}$ (mins) at 150° C. | 15.7 | 7.1 | 18.0 |

System 3 gives distinctly better resistance to reversion (after over vulcanisation for 45 minutes at 180° C.) than system 2 which contains zinc dibutyl dithiophosphate, and gives a much higher scorch resistance at 130° C. than system 2.

EXAMPLE 2

A master batch was prepared from the following constituents in an internal mixer:

| | | |
|---|---|---|
| natural rubber (RSS No. 1) | 100.00 | phr |
| carbon black N 330 (HAF) | 45.0 | phr |
| zinc oxide | 5.0 | phr |
| stearic acid | 3.0 | phr |
| aromat. mineral oil | 2.5 | phr |
| naphthen. mineral oil | 2.5 | phr |
| TMQ | 1.0 | phr |
| IPPD | 1.5 | phr |

The following mixtures were prepared on laboratory mixing rolls:

| | | |
|---|---|---|
| mixture 1 | sulphur | 1.425 phr |
| | MBS | 1.20 phr |
| mixture 2 | sulphur | 1.425 phr |
| | MBS | 0.60 phr |
| | N-di-methylamino-thiopentachlorobenzene | 1.20 phr |

The tests carried out and their results are shown in the following Table:

| Vulcameter measurement: | Mixture 1 | Mixture 2 |
|---|---|---|
| heat-up time: 1 minute | | |
| scorch time $t_s$/130° C. (mins) | 18.2 | 17.8 |
| flow time $t_s$/150° C. (mins) | 4.8 | 5.8 |
| cure time $t_{90}$/150° C. (mins) | 15.7 | 18.0 |
| cure time $t_{90}$/180° C. (mins) | 2.9 | 2.5 |
| shear modulus Fe-Fa/150° C. (mm) | 120 | 163 |

Stage heating
F = tensile strength
D = breaking elongation
M = modulus
H = hardness
E = elasticity
Str = structure according to Pohle (ring structure)

| | | F | D | M 100 | M | H | E 300 | Str |
|---|---|---|---|---|---|---|---|---|
| Mixture 1 | 150°/20' | 21.8 | 560 | 1.6 | 8.6 | 60 | 50 | 460 |
| | 25' | 22.5 | 580 | 1.7 | 8.3 | 60 | 49 | 375 |
| | 30' | 21.4 | 575 | 1.6 | 8.2 | 60 | 47 | 355 |
| | 45' | 21.0 | 560 | 1.5 | 7.9 | 59 | 47 | — |
| Mixture 2 | 150°/20' | 23.7 | 505 | 2.4 | 12.2 | 64 | 51 | 420 |
| | 25' | 22.5 | 485 | 2.4 | 11.9 | 64 | 51 | 403 |
| | 30' | 23.6 | 505 | 2.4 | 12.2 | 65 | 51 | 413 |
| | 45' | 23.4 | 490 | 2.4 | 12.3 | 64 | 51 | — |
| Mixture 1 | 180°/10' | 13.4 | 580 | 1.1 | 5.6 | 54 | 45 | — |
| | 20' | 14.5 | 560 | 1.1 | 4.9 | 52 | 44 | — |
| | 30' | 14.5 | 590 | 1.0 | 4.6 | 52 | 43 | — |
| | 45' | 13.3 | 570 | 1.0 | 4.6 | 52 | 44 | 77 |
| | 60' | 13.2 | 555 | 1.1 | 4.7 | 53 | 42 | 80 |
| Mixture 2 | 180°/10' | 21.5 | 505 | 2.0 | 10.2 | 61 | 49 | — |
| | 20' | 18.8 | 475 | 1.9 | 9.8 | 61 | 48 | — |
| | 30' | 19.2 | 490 | 1.9 | 9.5 | 61 | 46 | — |
| | 45' | 16.4 | 470 | 2.0 | 9.7 | 60 | 46 | 315 |
| | 60' | 17.3 | 460 | 1.9 | 9.3 | 61 | 45 | 181 |

(After ageing in hot air for 5 days at 100° C.)

| | | F | D | M 100 | M | H | E 300 | |
|---|---|---|---|---|---|---|---|---|
| Mixture 1 | 150°/20' | 11.7 | 315 | 2.4 | 11.0 | 63 | 46 | |
| | 25' | 9.9 | 285 | 2.4 | 11.0 | 61 | 43 | |
| | 30' | 10.3 | 300 | 2.4 | 10.5 | 62 | 42 | |
| Mixture 2 | 150°/20' | 13.0 | 310 | 2.8 | 10.5 | 66 | 47 | |
| | | 12.1 | 280 | 2.9 | 11.9 | 66 | 46 | |
| | | 12.9 | 305 | 2.9 | 12.8 | 67 | 47 | |

| | Mixture 1 | Mixture 2 |
|---|---|---|
| Chain fatigue $5 \times 10^6$ bends (heating stage 150° C./25 mins) | 1 | 0 |
| DIN wear (heating stage 150° C./20 mins) | 100 | 92 |
| Heat build-up in a Goodrich Flexometer heating stage 150° C./25 mins (°C.) | 18 | 11 |
| Flow (%) | −12 | −6 |
| Ball disintegration (heating stage 150° C./30 mins) destroyed after revolution | 8400 350 N/175° C. | 12067 425 N/164° C. |
| Reversion resistance after 45 minutes/180° C. (%) | 53.5 | 79 |

The vulcanisation system according to the invention (Mixture 2) shows distinct advantages over the comparison mixture 1 in regard to reversion resistance (after overvulcanisation for 45 minutes at 180° C.), structural strength, fatigue strength and fatigue strength after the "chain fatigue test". In addition, mixture 2 shows less heat build-up in the Goodrich Flexometer, less flow, a longer useful life in the ball disintegration test and less wear.

EXAMPLE 3

A master batch based on natural rubber/polybutadiene was prepared in an internal mixer from the constituents mentioned in Example 1. The following constituents were then mixed on laboratory mixing rolls:

| | | |
|---|---|---|
| vulcanisation system A | sulphur | 1.425 phr |
| | MBS | 1.20 phr |
| systems according to the invention 1-22 | sulphur | 1.425 phr |
| | MBS | 0.60 phr |
| | accelerator, variable | 1.20 phr |

| | | Reversion resistance after 45 minutes/180° C. (%) |
|---|---|---|
| Comparison system | A | 59.3 |
| system | 1 | 80 |
| | 2 | 74 |
| | 3 | 70.5 |
| | 4 | 80 |
| | 5 | 71 |
| | 6 | 74.5 |
| | 7 | 76.5 |
| | 8 | 73 |
| | 9 | 69 |
| | 10 | 70 |
| | 11 | 77 |
| | 12 | 79.5 |
| | 13 | 76 |
| | 14 | 75 |
| | 15 | 72 |
| | 16 | 81 |
| | 17 | 82 |
| | 18 | 78.5 |
| | 19 | 81 |
| | 20 | 63 |
| | 21 | 63 |
| | 22 | 78 |

The scorch time $t_s(15)$/130° C. is more than 17 minutes whilst the cure time $t_{90}$/150° C. is between 12 and 20 minutes.

The accelerators corresponding to general formula 1 used in Example 3 are as follows:

No.:
1: N-dimethylamino-thiopentachlorobenzene
2: N-di-ethylamino-thiopentachlorobenzene
3: N-di-n-propylamino-thiopentachlorobenzene
4: N-di-isopropylamino-thiopentachlorobenzene
5: N-di-n-butylamino-thiopentachlorobenzene
6: N-di-isobutylamino-thiopentachlorobenzene
7: N-pyrrolidino-thiopentachlorobenzene
8: N-piperidino-thiopentachlorobenzene
9: N-perhydroazepino-thiopentachlorobenzene
10: N-morpholino-thiopentachlorobenzene
11: N-methylamino-thiopentachlorobenzene
12: N-t-butylamino-thiopentachlorobenzene
13: N-n-butylamino-thiopentachlorobenzene
14: N-cyclohexylamino-thiopentachlorobenzene
15: N-phenylamino-thiopentachlorobenzene
16: N,N'-piperazino-bis-(thiopentachlorobenzene)
17: N,N'-ethylene-diamino-bis-(thiopentachlorobenzene)
18: N-butylamino-bis-(thiopentachlorobenzene)
19: N-cyclohexylamino-bis-(thiopentachlorobenzene)
20: N-(2,6-diethyl-phenyl)-thiopentachlorobenzene
21: N,N'-dicyclohexyl-thio-4-chlorobenzene
22: N,N-bis-(thio-2,4,5-trichlorophenyl)-amine

EXAMPLE 4

In an internal mixer a master batch such as mentioned in Example 2 was prepared. Subsequently the following components were added by mixing on laboratory mixing rolls:

| vulcanization system B: | sulphur | 1.425 phr |
| | MBS | 1.20 phr |
| systems according to the invention 23-28 | sulphur | 1.425 phr |
| | MBS accelerator | 0.60 phr |
| | variable | 1.20 phr |

| | | Reversion resistance after 45 min/ 180° C. (%) | Scorch time $t_s(15)/150°$ C. (Min) |
|---|---|---|---|
| Comparison system | B | 59,3 | 18 |
| | 23 | 91 | 18 |
| | 24 | 76 | 21,5 |
| | 25 | 79 | 18 |
| | 26 | 82 | 21 |
| | 27 | 95 | 20 |
| | 28 | 79 | 18 |

The accelerators used in Example 4 are as follows:
23: N,N'-phenylene-1,2-di(amino-thiopentachlorbenzene)
24: N,N'-phenylene-1,3-di(amino-thiopentachlorbenzene)
25: N,N'-naphthylene-1,5-di(amino-thiopentachlorbenzene)
26: N,N'-cyclohexylene-1,2-di(aminothiopentachlorbenzene)
27: N,N'-cyclohexylene-1,4-di(aminothiopentachlorbenzene)
28: N,N'-Xylylene-1,3-di(amino-thiopentachlorbenzene).

We claim:

1. A vulcanization system comprising
(A) from 20 to 50 parts by weight of sulfur or a sulfur donor,
(B) from 20 to 50 parts by weight of a mercapto or sulfenamide accelerator,
(C) from 0 to 10 parts by weight of a conventional auxiliary accelerator and
(D) from 20 to 50 parts by weight of a compound selected from the group consisting of

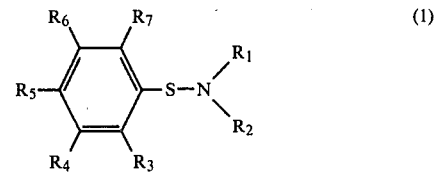

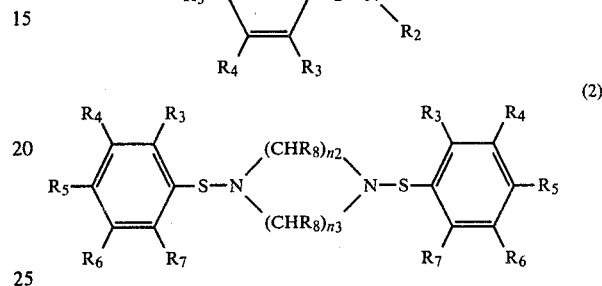

and

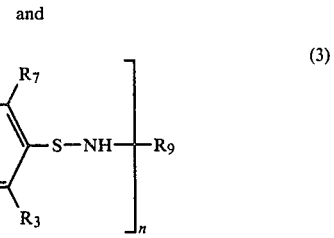

wherein $R_1$ taken separately is hydrogen, $C_1$–$C_{10}$ alkyl or alkenyl, $C_5$–$C_7$ cycloalkyl or cycloalkenyl, $C_6$–$C_{10}$ aryl, or $C_6$–$C_{10}$ aryl substituted at least once by alkyl having 1 to 4 carbon atoms;

$R_2$ taken separately is hydrogen, $C_1$–$C_{10}$ alkyl or alkenyl, $C_5$–$C_7$ cycloalkyl or cycloalkenyl, $C_6$–$C_{10}$ aryl, $C_6$–$C_{10}$ aryl substituted at least once by alkyl having 1 to 4 carbon atoms, a radical of the formula

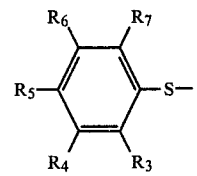

or a radical of the formula

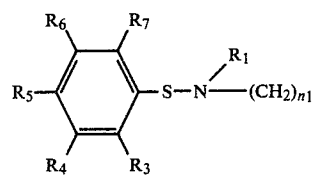

n is 2 or 3
$n_1$, $n_2$ and $n_3$ are each a number from 2 to 10;
$R_1$ and $R_2$ taken together form a 4- to 10-member carbocyclic ring or one of said rings containing N, O or S as a hetero atom;

$R_3$ to $R_7$ are each hydrogen, halogen, nitro, cyano, —$CF_3$, —$CCl_3$, alkoxy carbonyl having 2 to 5 carbon atoms or $C_1$–$C_4$ alkyl with the proviso that at least one of $R_3$–$R_7$ is other than hydrogen;

$R_8$ is hydrogen or methyl and $R_9$ is $C_4$–$C_{12}$ cycloalkyl, $C_6$–$C_{10}$ aryl, di-$C_4$–$C_{12}$ cycloalkyl substituted $C_1$–$C_4$ alkyl, tri-$C_4$–$C_{12}$ cycloalkyl substituted $C_1$–$C_4$ alkyl, di-$C_6$–$C_{10}$ aryl substituted $C_1$–$C_4$ alkyl or tri-$C_6$–$C_{10}$ aryl substituted $C_1$–$C_4$ alkyl.

2. A vulcanization system as claimed in claim 1 comprising
(A) from 40 to 50 parts by weight of sulfur or a sulfur donor,
(B) from 20 to 30 parts by weight of a mercapto or sulfenamide accelerator,
(C) from 0 to 5 parts by weight of a conventional auxiliary accelerator and
(D) from 20 to 30 parts by weight of compound (1) or compound (2).

* * * * *